Patented May 30, 1933

1,911,498

UNITED STATES PATENT OFFICE

KARL GOETZE, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

DESULPHURIZATION OF GASES

No Drawing. Application filed April 13, 1931, Serial No. 529,791, and in Germany April 30, 1930.

The present invention relates to improvements in the desulphurization of gases.

It has already been proposed to desulphurize gases containing hydrogen sulphide, such as the gases from the distillation of coal and to recover the sulphur, by passing the gases, together with the amount of air or oxygen requisite for the oxidation of the hydrogen sulphide into sulphur, over catalysts, especially active carbon. The oxidation to sulphur is attended with a considerable evolution of heat, which leads to a great increase in the temperature of the catalyst. It has further been proposed to carry out this process at such high temperatures that the sulphur is obtained in a molten condition. Difficulties, however, then arise owing to the fact that the molten sulphur, which is highly viscous immediately above its melting point, does not run off sufficiently fast, and clogs up the entire contact chamber, so that the resistance to the passage of the gas increases very considerably. Moreover, the molten sulphur is far more difficult to recover from the active carbon than that which is deposited at temperatures below the melting point of sulphur. Although by working at still higher temperatures, readily fluid sulphur can be obtained continuously, this proposal has failed to lead to any practicable process owing to the accurate regulation of temperature required. On the contrary it has always been found that notwithstanding suitable cooling, the process becomes impracticable when the gases contain a considerable proportion of sulphur, such as about 15 grams per cubic metre of the gas.

I have now found that the said process can be applied, without difficulty, even to gases containing more than 7 grams of sulphur per cubic metre (such as the waste gases from destructive hydrogenation processes and from the cracking and destructive distillation of sulphur-bearing organic substances) if the hydrogen sulphide content of the gases to be exposed to the catalyst, be first decreased by the addition of gases which are free from or low in sulphur. The amount of diluent gases added is such that the sulphur content of the gaseous mixture does not exceed about 7 grams of sulphur per cubic metre. A portion of the gas which has been freed from sulphur in the process itself may preferably be employed as the diluent, but other gases, free from or low in sulphur, such as industrial waste gases, hydrogen, nitrogen or carbon dioxide, may also be employed with advantage.

The oxidation of the hydrogen sulphide can be facilitated in any known or suitable manner by the presence of basic substances. In particular a small proportion of basic nitrogen compounds which may be solid or volatile, as for example ammonia or ammonium carbonate constitutes a suitable addition either to the gases or to the contact mass. Use may also be made of other basic substances such as sodium bicarbonate.

In the desulphurization of gases which contain substances that are injurious to the catalyst such as benzene hydrocarbons, it is often beneficial to subject the gases beforehand to a preliminary purification, for example with sulphuric acid or other suitable absorbents so as to remove the said injurious constituents.

The following example will further illustrate the nature of this invention which, however, is not restricted thereto.

Example 1,000 cubic metres of a waste gas obtained in the cracking of sulphur-bearing oils, and containing 25 grams of sulphur per cubic metre, are treated with an addition of 2,600 cubic metres of hydrogen or nitrogen, so that the sulphur content of the resulting mixture amounts to 7 grams per cubic metre. The mixture is then treated with the amount of air needed to oxidize the hydrogen sulphide at room temperature or slightly higher temperatures for example at 30° C. and with 0.1 gram of ammonia per cubic metre, and is passed through a layer of active carbon, in which the oxidation of the hydrogen sulphide to sulphur takes place. A portion of the sulphur-free gas issuing from the apparatus is cooled and is then mixed, in the said proportion, with further incoming quantities of the initial material to be desulphurized.

What I claim is:—

1. In the desulphurization of a crude gas, containing hydrogen sulphide in an amount corresponding to more than 7 grams of sulphur per cubic metre of the gas, by catalytically oxidizing the hydrogen sulphide to sulphur and separating the latter, the step which comprises adding to said gas a quantity of a gas, substantially free from hydrogen sulphide, sufficient for producing a gas mixture containing up to 7 grams of sulphur per cubic metre, prior to said catalytic oxidation.

2. A process as claimed in claim 1, in which the catalytic oxidation is effected by means of active carbon.

3. A process as claimed in claim 1, in which a portion of the purified gas is added to the crude gas for producing a gas mixture containing up to 7 grams of sulphur per cubic metre, prior to said catalytic oxidation.

4. A process as claimed in claim 1, in which the crude gas is a waste gas from a destructive hydrogenation.

5. A process as claimed in claim 1, in which the crude gas is a gas from a destructive distillation of a sulphur-bearing organic material.

6. A process as claimed in claim 1, in which the crude gas is a waste gas from a cracking of a sulphur-bearing oil.

In testimony whereof I have hereunto set my hand.

KARL GOETZE.